(12) United States Patent
Redon

(10) Patent No.: US 9,512,779 B2
(45) Date of Patent: Dec. 6, 2016

(54) SWIRL-CONSERVING COMBUSTION CHAMBER CONSTRUCTION FOR OPPOSED-PISTON ENGINES

(71) Applicant: Achates Power, Inc., San Diego, CA (US)

(72) Inventor: Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 515 days.

(21) Appl. No.: 14/026,931

(22) Filed: Sep. 13, 2013

(65) Prior Publication Data
US 2014/0014063 A1 Jan. 16, 2014

Related U.S. Application Data

(63) Continuation-in-part of application No. 13/843,686, filed on Mar. 15, 2013, which is a continuation-in-part of application No. 13/066,589, filed on Apr. 18, 2011, now Pat. No. 8,800,528, said application No.

(Continued)

(51) Int. Cl.
*F02B 75/16* (2006.01)
*F02B 23/06* (2006.01)
(Continued)

(52) U.S. Cl.
CPC ............... *F02B 75/16* (2013.01); *F01B 7/02* (2013.01); *F02B 23/0621* (2013.01);
(Continued)

(58) Field of Classification Search
CPC ...... F02B 75/28; F02B 75/282; F02B 25/08; F02B 25/10; F02B 23/0618; F02B 23/0621; F02B 23/0624; F02B 23/063; F02B 23/0633; F02B 23/0672; F02B 23/0675; F02B 23/0678; F02B 23/0681; F02B 23/0684; F02B 23/0687; F02B 23/069; F02B 23/0693; F02B 23/0696; F02B 2275/40; F02B 2275/48; F01B 7/02; F01B 7/14; F02F 3/26
USPC ........ 123/51 B, 51 BA, 51 BD, 51 R, 193.6, 123/295, 299, 301
See application file for complete search history.

(56) References Cited

U.S. PATENT DOCUMENTS

| | | |
|---|---|---|
| 665,475 A | 1/1901 | Schweitzer |
| 667,298 A | 2/1901 | Cunningham |

(Continued)

FOREIGN PATENT DOCUMENTS

| | | |
|---|---|---|
| BE | 388676 | 5/1932 |
| DE | 4335515 A1 | 4/1995 |

(Continued)

OTHER PUBLICATIONS

International Search Report and Written Opinion for PCT application No. PCT/US2014/054215, mailed Feb. 16, 2016.

(Continued)

*Primary Examiner* — Mahmoud Gimie
*Assistant Examiner* — John Zaleskas
(74) *Attorney, Agent, or Firm* — Terrance A. Meador; Julie J. Muyco

(57) ABSTRACT

A combustion chamber construction for opposed-piston engines includes an elongated, bilaterally symmetrical shape referenced to a major axis and a pair of injection ports located on the major axis when the pistons are near respective top center positions. The combustion chamber is defined between a bowl in the end surface of a first piston of a pair of pistons and mirrored ridges protruding from the end surface of a second piston of the pair. Each ridge includes a central portion that curves toward a periphery of the end surface of the second piston and which transitions to flanking portions that curve away from the periphery. The ridge configuration imparts a substantially spherical configuration to a central portion of the combustion chamber where swirling motion of charge air is conserved.

21 Claims, 7 Drawing Sheets

Related U.S. Application Data

13/843,686 is a continuation-in-part of application No. PCT/US2012/038061, filed on May 16, 2012.

(60) Provisional application No. 61/343,308, filed on Apr. 27, 2010, provisional application No. 61/395,845, filed on May 18, 2010, provisional application No. 61/401,598, filed on Aug. 16, 2010, provisional application No. 61/519,194, filed on May 18, 2011.

(51) Int. Cl.
 *F01B 7/02* (2006.01)
 *F02B 75/28* (2006.01)

(52) U.S. Cl.
 CPC ...... *F02B 23/0624* (2013.01); *F02B 23/0633* (2013.01); *F02B 23/0651* (2013.01); *F02B 23/0678* (2013.01); *F02B 75/282* (2013.01); *F02B 2275/48* (2013.01); *Y02T 10/125* (2013.01)

(56) References Cited

U.S. PATENT DOCUMENTS

| | | | |
|---|---|---|---|
| 673,160 A | 4/1901 | Diesel | |
| 1,143,408 A | 6/1915 | Kramer | |
| 1,207,799 A * | 12/1916 | Scheller | 123/281 |
| 1,312,604 A | 8/1919 | Wygodsky | |
| 1,423,088 A | 7/1922 | Crossley et al. | |
| 1,464,268 A | 8/1923 | Otto | |
| 1,486,583 A * | 3/1924 | Huskisson | F02B 75/282 |
| | | | 123/41.83 |
| 1,515,391 A * | 11/1924 | Keller | F02B 23/00 |
| | | | 123/276 |
| 1,523,453 A * | 1/1925 | Scott | F02B 23/00 |
| | | | 123/51 B |
| 1,582,792 A | 4/1926 | Schultz | |
| 1,623,704 A * | 4/1927 | Scott | F02B 75/28 |
| | | | 123/51 B |
| 1,644,954 A | 10/1927 | Shearer | |
| 1,662,828 A | 3/1928 | Law | |
| 1,808,664 A * | 6/1931 | Koschka | F02B 75/26 |
| | | | 123/41.35 |
| 1,837,870 A * | 12/1931 | Johnston | F01B 7/14 |
| | | | 123/198 DC |
| 1,853,562 A | 4/1932 | Herr | |
| 1,854,190 A | 4/1932 | Herr | |
| 1,967,630 A | 7/1934 | Rusberg | |
| 1,978,194 A | 10/1934 | Gray | |
| 2,014,672 A | 9/1935 | Schmaljohann | |
| 2,110,116 A | 3/1938 | Heraclio | |
| 2,132,083 A * | 10/1938 | Pescara | F02B 71/00 |
| | | | 123/275 |
| 2,173,081 A * | 9/1939 | Barkeij | F02B 9/00 |
| | | | 123/275 |
| 2,196,429 A | 4/1940 | Siciliano | |
| 2,337,245 A | 12/1943 | Jacklin | |
| 2,354,620 A * | 7/1944 | Smith | F02C 5/06 |
| | | | 123/41.79 |
| 2,393,085 A | 1/1946 | Wuehr | |
| 2,396,429 A * | 3/1946 | Krygsman | F02B 45/02 |
| | | | 123/51 B |
| 2,440,310 A | 4/1948 | Thege | |
| 2,463,418 A | 3/1949 | Pescara | |
| 2,530,884 A * | 11/1950 | Laraque | F01B 7/12 |
| | | | 123/197.1 |
| 2,565,368 A * | 8/1951 | Hammick | F01B 7/14 |
| | | | 123/51 BC |
| 2,607,328 A | 8/1952 | Jencick | |
| 2,646,779 A | 7/1953 | Fiser | |
| 2,682,862 A * | 7/1954 | Camner | F02B 3/00 |
| | | | 123/276 |
| 2,699,156 A | 1/1955 | Karrow | |
| 2,731,003 A | 1/1956 | Morris | |
| 2,748,757 A * | 6/1956 | Morris | F02B 25/00 |
| | | | 123/294 |
| 2,805,654 A | 9/1957 | Jacklin | |
| 2,853,983 A | 9/1958 | Sawle | |
| 3,023,743 A * | 3/1962 | Schauer, Jr. | F01B 7/14 |
| | | | 123/294 |
| 3,033,184 A | 5/1962 | Jackson | |
| 3,117,566 A | 1/1964 | Venediger | |
| 3,134,373 A * | 5/1964 | Schauer, Jr. | F01B 7/14 |
| | | | 123/51 BA |
| 3,209,736 A * | 10/1965 | Witzky | F01B 7/12 |
| | | | 123/48 R |
| 3,411,289 A | 11/1968 | Antonsen et al. | |
| 4,030,471 A * | 6/1977 | Ginkel | F01B 1/0613 |
| | | | 123/197.1 |
| 4,090,479 A | 5/1978 | Kaye | |
| 4,248,183 A * | 2/1981 | Noguchi | F01B 7/14 |
| | | | 123/51 B |
| 4,257,365 A * | 3/1981 | Noguchi | F02B 25/08 |
| | | | 123/51 B |
| 4,452,221 A | 6/1984 | Keating | |
| 4,491,096 A * | 1/1985 | Noguchi | F01B 1/10 |
| | | | 123/51 B |
| 4,574,754 A * | 3/1986 | Rhoades, Jr. | F02B 17/005 |
| | | | 123/188.11 |
| 4,622,927 A * | 11/1986 | Wenker | F01B 3/02 |
| | | | 123/51 B |
| 4,791,787 A * | 12/1988 | Paul | F02B 77/02 |
| | | | 123/193.2 |
| 4,872,433 A * | 10/1989 | Paul | F02B 23/02 |
| | | | 123/257 |
| 4,905,637 A * | 3/1990 | Ott | F01B 3/0026 |
| | | | 123/196 R |
| 5,042,441 A * | 8/1991 | Paul | F01B 7/14 |
| | | | 123/257 |
| 5,081,963 A * | 1/1992 | Galbraith | F01L 1/34 |
| | | | 123/188.5 |
| 5,083,530 A | 1/1992 | Rassey | |
| 5,711,269 A * | 1/1998 | Oda | F02B 17/005 |
| | | | 123/262 |
| 6,161,518 A | 12/2000 | Nakakita et al. | |
| 6,170,443 B1 * | 1/2001 | Hofbauer | F02B 25/08 |
| | | | 123/51 B |
| 6,182,619 B1 * | 2/2001 | Spitzer | F02B 25/08 |
| | | | 123/51 B |
| 6,345,601 B1 | 2/2002 | Miyajima et al. | |
| 6,443,122 B1 | 9/2002 | Denbratt et al. | |
| 6,854,440 B2 | 2/2005 | Cathcart et al. | |
| 6,874,489 B2 | 4/2005 | Yonekawa et al. | |
| 6,928,997 B2 | 8/2005 | Yu | |
| 6,997,158 B1 | 2/2006 | Liu | |
| 7,210,448 B2 | 5/2007 | Stanton et | |
| 7,284,524 B2 | 10/2007 | Matas et al. | |
| 7,428,889 B2 * | 9/2008 | Salzgeber | F02F 3/22 |
| | | | 123/193.6 |
| 7,438,039 B2 | 10/2008 | Poola et al. | |
| 7,597,084 B2 | 10/2009 | Vachon et al. | |
| 8,549,854 B2 | 10/2013 | Dion et al. | |
| 8,800,528 B2 | 8/2014 | Fuqua et al. | |
| 8,820,294 B2 | 9/2014 | Fuqua et al. | |
| 2005/0066929 A1 | 3/2005 | Liu | |
| 2005/0150478 A1 | 7/2005 | Nomura | |
| 2006/0124084 A1 | 6/2006 | Hofbauer et al. | |
| 2006/0157003 A1 | 7/2006 | Lemke et al. | |
| 2007/0272191 A1 | 11/2007 | Tsujimoto et al. | |
| 2008/0006238 A1 | 1/2008 | Hofbauer et al. | |
| 2008/0115771 A1 | 5/2008 | Elsbett | |
| 2008/0127947 A1 | 6/2008 | Hofbauer et al. | |
| 2009/0139476 A1 * | 6/2009 | Hofbauer | F02B 1/12 |
| | | | 123/55.2 |
| 2009/0139485 A1 | 6/2009 | Pontoppidan | |
| 2009/0159022 A1 | 6/2009 | Chu | |
| 2010/0006061 A1 | 1/2010 | Shibata et al. | |
| 2010/0107868 A1 | 5/2010 | Scharp et al. | |
| 2010/0108044 A1 | 5/2010 | Liu | |
| 2010/0224162 A1 | 9/2010 | Hofbauer | |
| 2010/0282219 A1 * | 11/2010 | Alonso | F01B 3/10 |
| | | | 123/51 AA |
| 2011/0041684 A1 | 2/2011 | Kortas et al. | |

(56) References Cited

U.S. PATENT DOCUMENTS

| | | | |
|---|---|---|---|
| 2011/0067671 A1* | 3/2011 | Laimboeck | F02B 23/104 123/298 |
| 2011/0114038 A1* | 5/2011 | Lemke | F16J 9/14 123/41.35 |
| 2011/0271932 A1* | 11/2011 | Fuqua | F01B 7/02 123/301 |
| 2012/0073526 A1* | 3/2012 | Dion | F01B 7/08 123/41.44 |
| 2012/0073541 A1* | 3/2012 | Fuqua | F01B 7/02 123/301 |
| 2012/0080007 A1* | 4/2012 | Herold | F02B 23/0645 123/299 |
| 2012/0125298 A1 | 5/2012 | Lemke et al. | |
| 2012/0192831 A1* | 8/2012 | Tusinean | F02B 23/0663 123/299 |
| 2012/0234285 A1 | 9/2012 | Venugopal et al. | |
| 2012/0285418 A1 | 11/2012 | Elsbett et al. | |
| 2013/0014718 A1* | 1/2013 | Shen | F02B 23/0675 123/18 A |
| 2013/0025556 A1* | 1/2013 | Hofbauer | F01B 7/08 123/18 R |
| 2013/0036999 A1* | 2/2013 | Levy | F02B 75/282 123/299 |
| 2013/0104848 A1 | 5/2013 | Klyza et al. | |
| 2013/0112175 A1* | 5/2013 | Wahl | F02F 3/16 123/51 R |
| 2013/0146021 A1* | 6/2013 | Hofbauer | F02B 17/005 123/299 |
| 2013/0213342 A1 | 8/2013 | Burton et al. | |
| 2014/0014063 A1 | 1/2014 | Redon | |
| 2014/0083396 A1* | 3/2014 | Burton | F01B 7/02 123/51 R |
| 2014/0090625 A1* | 4/2014 | Dion | F02F 3/16 123/51 R |
| 2015/0033736 A1 | 2/2015 | Kalebjian et al. | |

FOREIGN PATENT DOCUMENTS

| | | |
|---|---|---|
| DE | 19651175 A1 | 6/1998 |
| DE | 10141888 A1 | 4/2003 |
| DE | 102004010361 A1 | 12/2004 |
| DE | 102006055251 A1 | 5/2008 |
| DE | 102008055911 A1 | 5/2010 |
| FR | 50349 | 3/1940 |
| GB | 191409948 | 4/1915 |
| GB | 320439 | 10/1929 |
| GB | 320439 A * | 10/1929 ............. F02B 23/00 |
| GB | 531366 | 1/1941 |
| GB | 540658 A | 10/1941 |
| GB | 552758 A | 4/1943 |
| GB | 562343 | 6/1944 |
| GB | 2493260 | 1/2013 |
| JP | 52004909 A | 1/1977 |
| JP | 2009-138718 | 6/2009 |
| SU | 1216394 A1 | 3/1986 |
| WO | WO-99/58830 | 11/1999 |
| WO | WO-01/25618 A1 | 4/2001 |
| WO | WO-02/48524 A1 | 6/2002 |
| WO | WO-2006/105390 A1 | 10/2006 |
| WO | WO-20071006469 A2 | 1/2007 |
| WO | WO-2009/061873 A1 | 5/2009 |
| WO | WO-2011/061191 A1 | 5/2011 |
| WO | WO-2011/139332 A1 | 11/2011 |
| WO | WO-2012/023970 A2 | 2/2012 |
| WO | WO-2012/023975 A1 | 2/2012 |
| WO | WO-2012/158756 A1 | 11/2012 |
| WO | WO-20121/58756 A1 | 11/2013 |

OTHER PUBLICATIONS

Hofbauer, P., *SAE Publication* 2005-01-1548, "Opposed Piston Opposed Cylinder (opoc) Engine for Military Ground Vehicles," Apr. 2005.

Franke, M., *SAE Publication* 2006-01-0277, "Opposed Piston Opposed Cylinder (opoc) 450 Engine: Performance Development by CAE Simulations and Testing," M. Franke, et al, Apr. 2006.

Hirsch, N.R., et al, *SAE Publication* 2006-01-0926, "Advanced Opposed Piston Two-stroke Diesel Demonstrator," Apr. 2006.

Pirault, J-P., et al, *Opposed Piston Engines: Evolution, Use, and Future Applications*, 2010, pp. 231-245.

International Search Report/Written Opinion for PCT/ US2011/000692, mailed Aug. 18, 2011.

International Search Report/Written Opinion for PCT/US2011/001436, mailed Nov. 3, 2011.

International Search Report/Written Opinion for PCT/US2012/038061, mailed May 16, 2012.

International Search Report/Written Opinion for PCT/US2014/026670, mailed Jul. 10, 2014.

\* cited by examiner

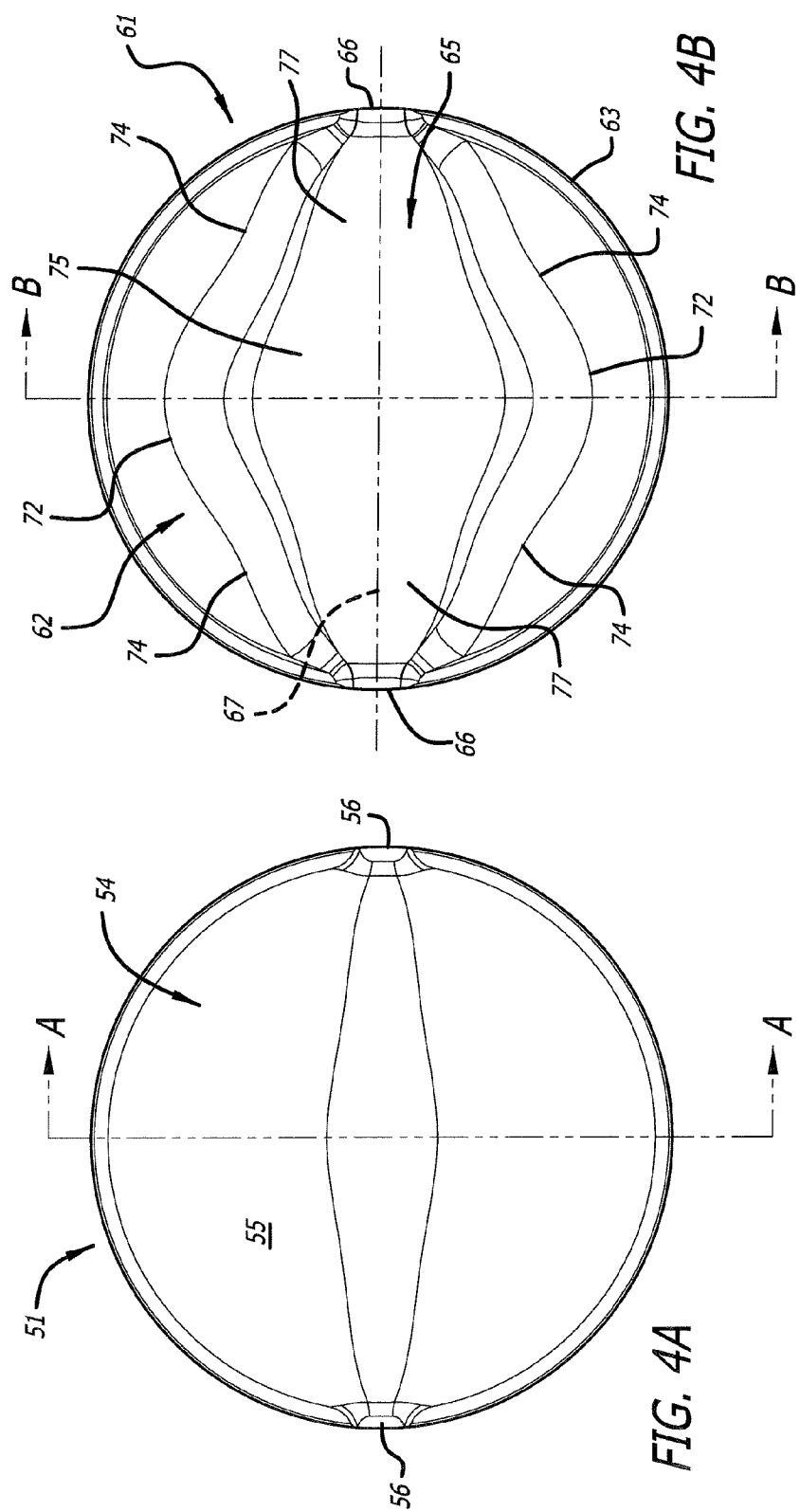

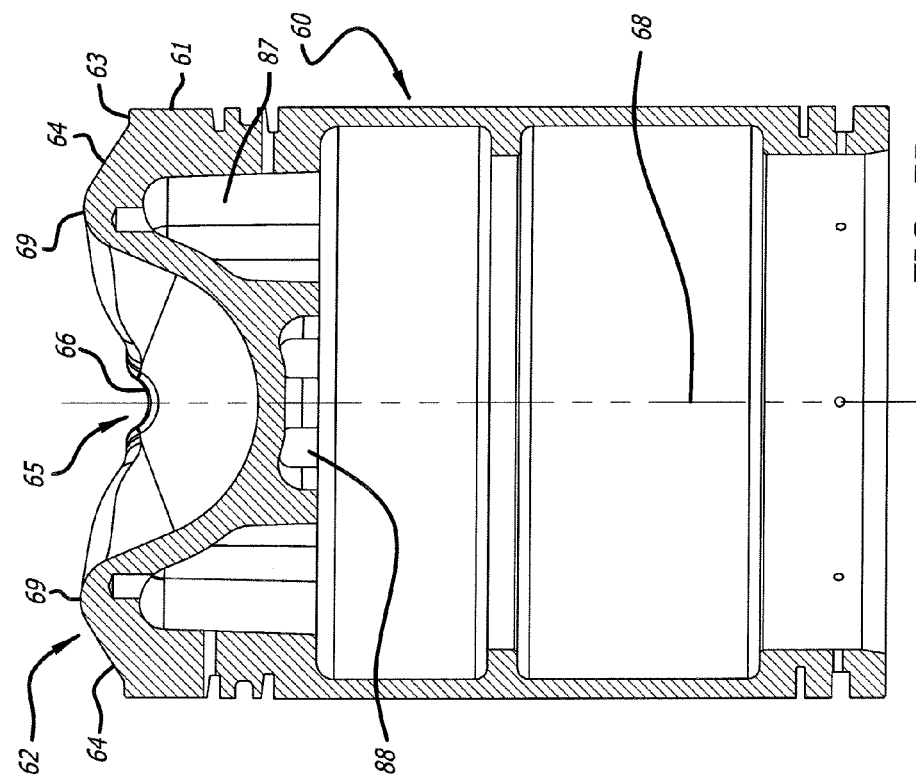
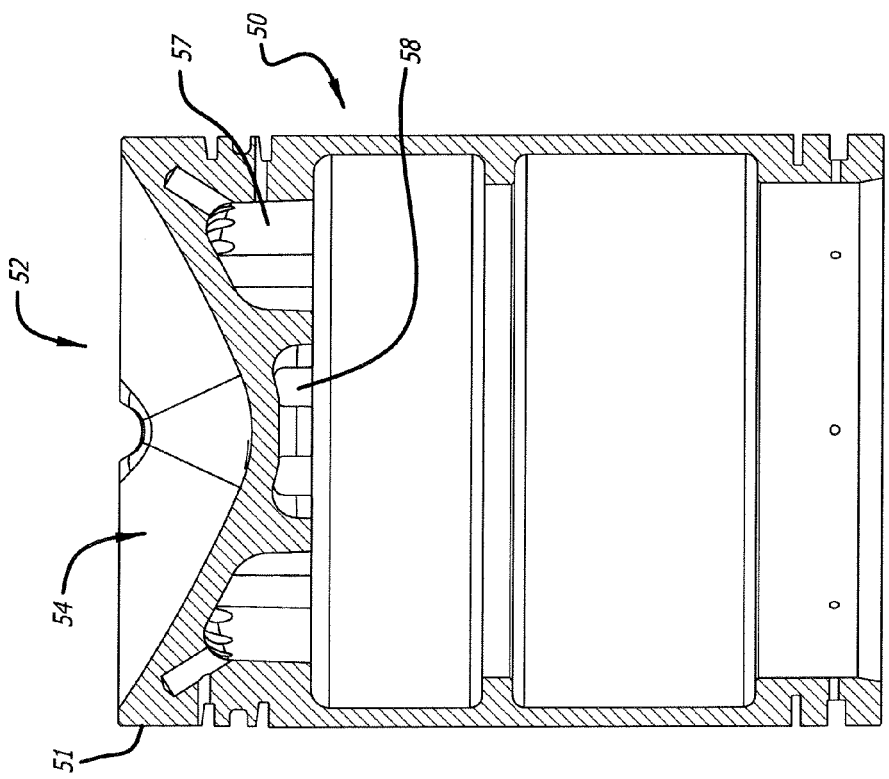
FIG. 5B
FIG. 5A

SWIRL-CONSERVING COMBUSTION CHAMBER CONSTRUCTION FOR OPPOSED-PISTON ENGINES

PRIORITY

This application is a continuation-in-part of U.S. patent application Ser. No. 13/843,686, filed Mar. 15, 2013, which is a continuation-in-part of U.S. patent application Ser. No. 13/066,589, filed Apr. 18, 2011, which claims priority to U.S. provisional application 61/343,308, filed Apr. 27, 2010, U.S. provisional application 61/395,845, filed May 18, 2010, and U.S. provisional application 61/401,598, filed Aug. 16, 2010, and which was published as US 2011/0271932 on 10 Nov. 2011. U.S. patent application Ser. No. 13/843,686 is also a continuation-in-part of PCT application US2012/038061, filed 16 May 2012, which claims priority to U.S. 61/519,194, filed 18 May 2011 and which was published as WO 2012/158765 on 22 Nov. 2012.

BACKGROUND

The field includes opposed-piston engines in which a combustion chamber is defined between end surfaces of pistons disposed in opposition in the bore of a ported cylinder. More particularly, the field includes opposed-piston engines with combustion chamber constructions that promote complex, turbulent bulk motion in charge air admitted into the cylinder.

A two-stroke cycle engine is an internal combustion engine that completes a cycle of operation with a single complete rotation of a crankshaft and two strokes of a piston connected to the crankshaft. One example of a two-stroke cycle engine is an opposed-piston engine in which a pair of pistons is disposed in opposition in the bore of a cylinder for reciprocating movement in opposing directions. Per FIG. 1, an opposed-piston engine includes at least one cylinder 10 with a bore 12 and longitudinally-displaced intake and exhaust ports 14 and 16 machined or formed therein. (In some aspects, when the term "cylinder" is used in this application, it refers also to a cylinder liner.) One or more fuel injectors 17 are secured in injector ports (ports where injectors are positioned) that open through the side surface of the cylinder. Two pistons 20, 22 according to the prior art are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

Operation of an opposed-piston engine with one or more ported cylinders (cylinders with one or more of intake and exhaust ports formed therein) such as the cylinder 10 is well understood. In this regard, a power stroke commences when, in response to combustion, the opposed pistons move away from respective top center (TC) positions where they are at their innermost positions in the cylinder 10. While moving from TC, the pistons keep their associated ports closed until they approach respective bottom center (BC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

For example, presume the exhaust piston leads the intake piston and the phase offset causes the pistons to move around their BC positions in a sequence in which the exhaust port 16 opens as the exhaust piston 22 moves through BC while the intake port 14 is still closed so that combustion gasses start to flow out of the exhaust port 16. As the pistons continue moving away from each other, the intake piston 20 moves through BC causing the intake port 14 to open while the exhaust port 16 is still open. As the pistons reverse direction, the exhaust port closes first, followed by the intake port.

A compression stroke commences when the pistons reverse direction and move from BC toward TC positions. As the pistons move away from their BC positions their movements are phased such that the port openings overlap to promote scavenging. In scavenging, a charge of pressurized air is forced into the cylinder 10 through the open intake port 14, driving exhaust gasses out of the cylinder through the open exhaust port 16. Typically, the charge of fresh air is swirled as it passes through ramped openings of the intake port 14. With reference to FIG. 1, the swirling motion (or simply, "swirl") is a generally helical movement of charge air that circulates around the cylinder's longitudinal axis and moves longitudinally through the bore of the cylinder 10. Per FIG. 2, as the pistons 20, 22 continue moving toward TC, the ports close and the swirling charge air remaining in the cylinder is compressed between the end surfaces 20e and 22e. As the pistons near their respective TC locations in the cylinder bore, fuel 40 is injected into the compressed charge air 30, between the end surfaces 20e, 22e of the pistons. As injection continues, the swirling mixture of air and fuel is increasingly compressed in a combustion chamber 32 defined between the end surfaces 20e and 22e. When the mixture reaches an ignition temperature, fuel ignites in the combustion chamber, initiating another power stroke by driving the pistons apart toward their respective BC locations.

The geometries of the intake port openings and the cylinder of an opposed-piston engine provide a very effective platform for generation of a strong bulk fluid motion of the charge air in the form of swirl that promotes both removal of exhaust gasses (scavenging) and the movement of fuel to air (air/fuel mixing). However, charge air motion that is dominated by swirl can produce undesirable effects during combustion. For example, during combustion in a cylindrical combustion chamber defined between flat piston end surfaces, swirl pushes the flame toward the cylinder bore, causing heat loss to the (relatively) cooler cylinder wall. The higher velocity vectors of swirl occur near the cylinder wall, which provides the worst scenario for heat losses: high temperature gas with velocity that transfers heat to the cylinder wall and lowers the thermal efficiency of the engine. The peripheries of the piston end surfaces also receive a relatively high heat load, which causes formation of a solid residue of oil coke that remains in the piston/cylinder interface when lubricating oil breaks down at high engine temperatures.

Accordingly, it is desirable to maintain the benefits provided by swirl while mitigating its undesirable effects as combustion begins. At the same time, it is desirable to continue to promote turbulence in the charge air motion in order to encourage a homogeneous mixture of fuel and air, which in turn, produces more complete and more uniform ignition than would otherwise occur.

These advantages have been achieved in two-stroke opposed-piston engines by provision of shapes in the opposing end surfaces of the pistons that generate additional components of bulk air turbulence in the combustion chamber. In this regard, certain opposed-piston combustion chamber constructions include bowls that promote squish flow from the periphery of the combustion chamber in a radial direction of the cylinder toward the cylinder's axis. In some aspects, squish flow can be inwardly directed as when a high pressure region at the peripheries of the piston end surfaces causes charge air to flow to a lower-pressure region generated by a bowl formed in at least one piston end surface. For example, U.S. Pat. No. 1,523,453 describes a pair of opposed pistons having depressions formed in their heads which form a pear-shaped combustion chamber when the pistons are adjacent each other. The larger end of the chamber is substantially closed and the smaller end is open to permit injection of fuel into the chamber by an injection valve in the cylinder wall.

A number of recently-disclosed opposed piston designs have been directed to generation of tumble in bulk motion of charge air. For example, grandparent U.S. application Ser. No. 13/066,589 describes formation of an ellipsoidally-shaped combustion chamber between projecting curved ridges in the adjacent end surfaces of opposed pistons. The curved ridges are identical, but mutually inverted by 180°. The end surfaces interact with swirl and squish flows to produce tumble at the narrow ends of the combustion chamber, near the bore surface of the cylinder. The wider central portion of the combustion chamber preserves swirl. Priority application Ser. No. 13/843,686 describes an improvement to this mutually-inverted ridge configuration in which the central portion of the combustion chamber has a pronounced spherical aspect that preserves more swirl than the mainly ellipsoidal shape. An ellipsoidally-shaped combustion chamber formed between opposed pistons having non-identical, but complementary end surface shapes is described in the grandparent PCT application. In this construction, a concave bowl is formed in one end surface. The opposing end surface has a convex projection in which a bilaterally-tapered, diametrical cleft is formed between mirrored, continuously curved ridges. When the end surfaces are adjacent, the convex projection is received in the concave bowl and the combustion chamber is defined principally by the cleft. Bordering squish regions are formed on either side of the chamber by opposing convex/concave end surface portions.

The pistons described in the grandparent and parent US applications are subjected to significant thermal challenges. Both of the opposing pistons have highly contoured end surfaces in which the heat load falls heavily on the curved ridges. The intake piston is afforded some thermal relief by the passage of charge air over its end surface during scavenging. But this construction requires a piston cooling construction with a thermal capacity designed to adequately cool the exhaust piston. These challenges are mitigated by the combustion chamber construction of the grandparent PCT application, in which the piston with the concave bowl is placed in the exhaust side of the cylinder and the piston with the cleft-defining mirrored ridges is placed in the intake side. The concave bowl lacks projecting ridges, which makes it easier to cool in spite of its exposure to outflowing exhaust gases, while the cooling effect of in-flowing charge air is delivered to the mirrored ridges during scavenging. However, the continuously-curved configurations of the ridges define a combustion chamber shape that lacks the enhanced swirl-conserving effects.

SUMMARY

It is therefore an objective to provide a combustion chamber for an opposed-piston engine that produces a complex, turbulent bulk motion in charge air, while preserving swirl in a central portion of the chamber and rationalizing the thermal aspects of chamber construction.

The objective is achieved by piston constructions which utilize a bowl/mirrored ridge construction that distributes the combustion chamber volume between a central, largely spherical (or spheroidal) volume which holds most of the heat of combustion and lateral spray clearance channels that are mutually aligned along an injection axis and disposed on respective sides of the central volume. The bowl construction is provided on the end surface of one piston of a pair of opposed pistons and the mirrored ridge construction is provided on the end surface of the other piston of the pair. Preferably, the bowl construction is provided on the end surface of an exhaust piston of a pair of opposed pistons and the mirrored ridge construction is provided on the end surface of an intake piston of the pair.

The central, largely spherical, volume of the combustion chamber preserves much of the swirl in the bulk motion of the charge air when the combustion chamber is formed between the end surfaces of opposed pistons. The conserved swirl acts jointly with tumble flows to create a generally spherical (or spheroidal) bulk air flow field when the pistons approach minimum separation.

In some aspects of the preferred construction, paired opposing pistons have complementary opposing end surfaces. A generally concave bowl formed in one end surface receives a generally convex protrusion of the opposing end surface when the pistons are adjacent. An elongated cleft with a widened central portion formed in the convex protrusion extends in a diametrical direction of the end surface, is symmetrically shaped in cross-section with respect to a plane of symmetry, and has a shape in plan that tapers bi-directionally from a generally spherical center to narrower end. When the pistons are at or near TC, the cleft is positioned adjacent the generally concave bowl, and there defines an elongated, tapered combustion chamber with a central, largely spherical (or spheroidal) volume and lateral curved spray clearance channels that are mutually aligned along an injection axis and disposed on respective sides of the central space.

BRIEF DESCRIPTION OF THE DRAWINGS

FIGS. 4A and 4B are end views of the pistons of FIGS. 3A and 3B, respectively, showing details of their end surfaces.

FIGS. 5A and 5B are side section views of the pistons of FIGS. 3A and 3B, respectively.

DETAILED DESCRIPTION OF THE PREFERRED EMBODIMENTS

In the construction to be described, an opposed-piston engine includes at least one cylinder with a bore and longitudinally-separated exhaust and intake ports formed or machined in the sidewall of the cylinder. A pair of pistons is disposed in opposition in the bore of the cylinder, and a combustion chamber is defined between the opposing end surfaces of the pistons as the pistons move through respective TC positions. A circumferential area includes a periphery on each of the end surfaces. The combustion chamber structure includes a cavity or space in the bore that is defined by the opposing end surfaces of the pistons. In plan, the combustion chamber has an elongated trench-like shape with a widened central portion. The elongated combustion chamber shape extends in a diametrical direction of the cylinder. The combustion chamber has diametrically opposing openings through which fuel is injected.

During operation of the internal combustion engine, as the pistons approach TC, one or more squish zones direct flows of compressed air (called "squish flows") into the combustion chamber. This process is referred to as "generating squish".

The construction to be described produces a bulk fluid motion in the combustion chamber due to the interaction of the swirling flow of charge air in the cylinder with the piston end surfaces as the pistons move towards TC. The bulk fluid motion includes elements of swirl, squish, and tumble.

In the following descriptions, "fuel" is any fuel that can be used in an opposed-piston engine. The fuel may be a relatively homogeneous composition, or a blend. For example, the fuel may be a gaseous fuel, a liquid fuel, or any other fuel ignitable by compression ignition. The descriptions contemplate injection of fuel into a compressed gas in a combustion chamber when opposed pistons are at or near TC locations. In some aspects, injection may occur earlier in the compression stroke. The gas is preferably pressurized ambient air; however, it may include other components such as exhaust gases or other diluents. In any such case, the gas is referred to as "charge air."

Figure 1:
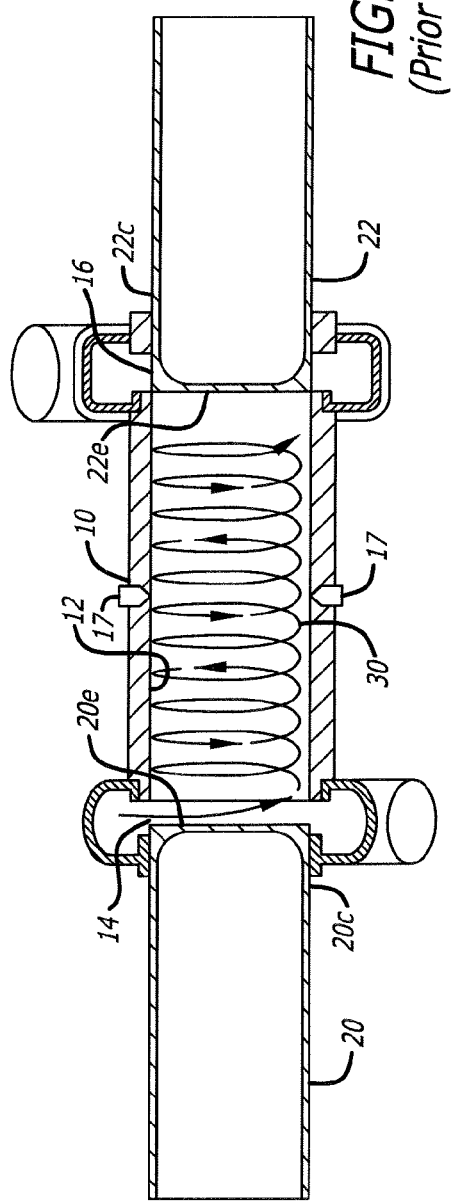
FIG. 1 is a side sectional partially schematic drawing of a cylinder of an opposed-piston engine with prior art opposed pistons near respective bottom dead center locations, and is appropriately labeled "Prior Art".
Figure 2:
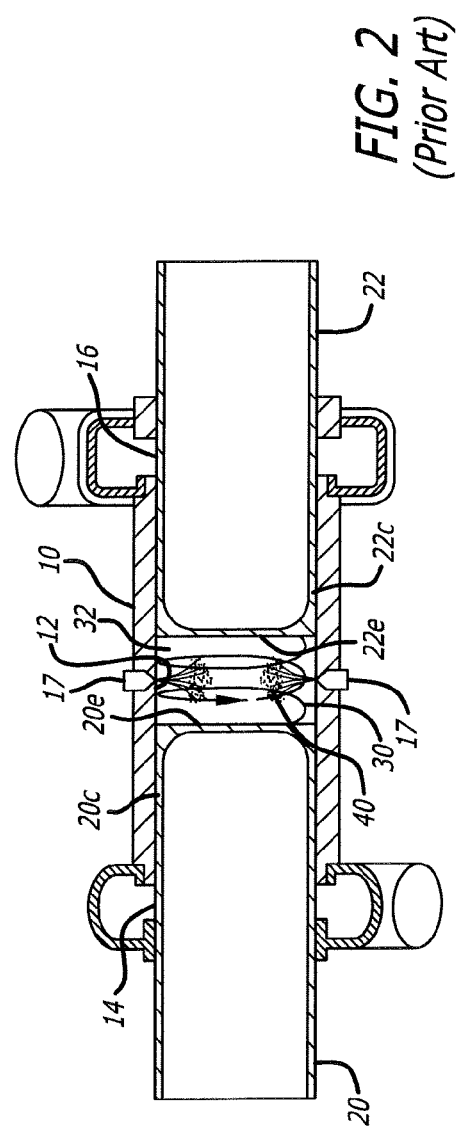
FIG. 2 is a side sectional partially schematic drawing of the cylinder of FIG. 1 with the prior art opposed pistons near respective top dead center locations where flat end surfaces of the pistons define a combustion chamber, and is appropriately labeled "Prior Art".
Figure 3B:
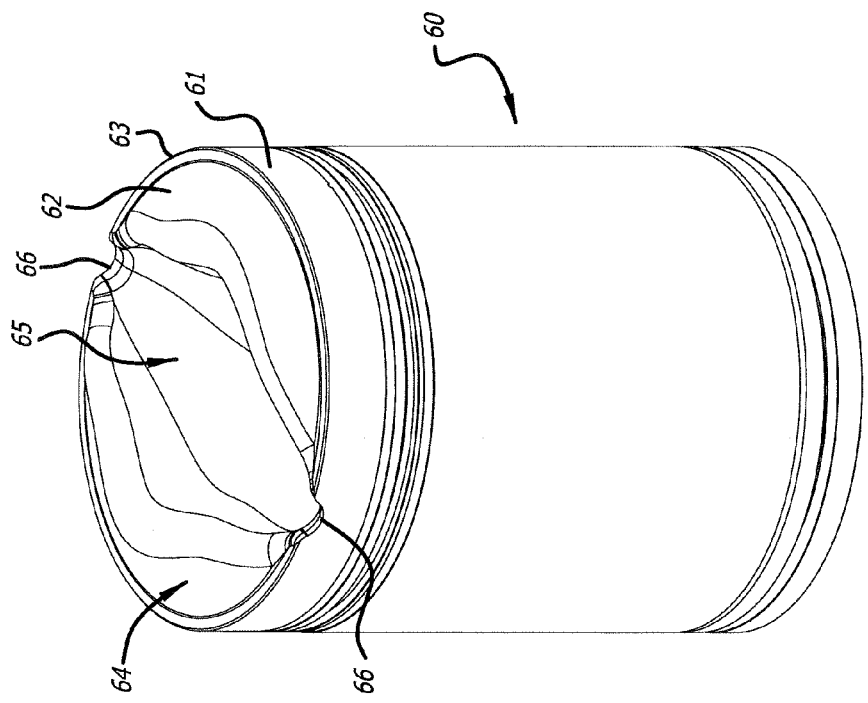
FIGS. 3A and 3B are isometric views of a pair of pistons that together define a preferred combustion chamber construction.
Figure 3A:
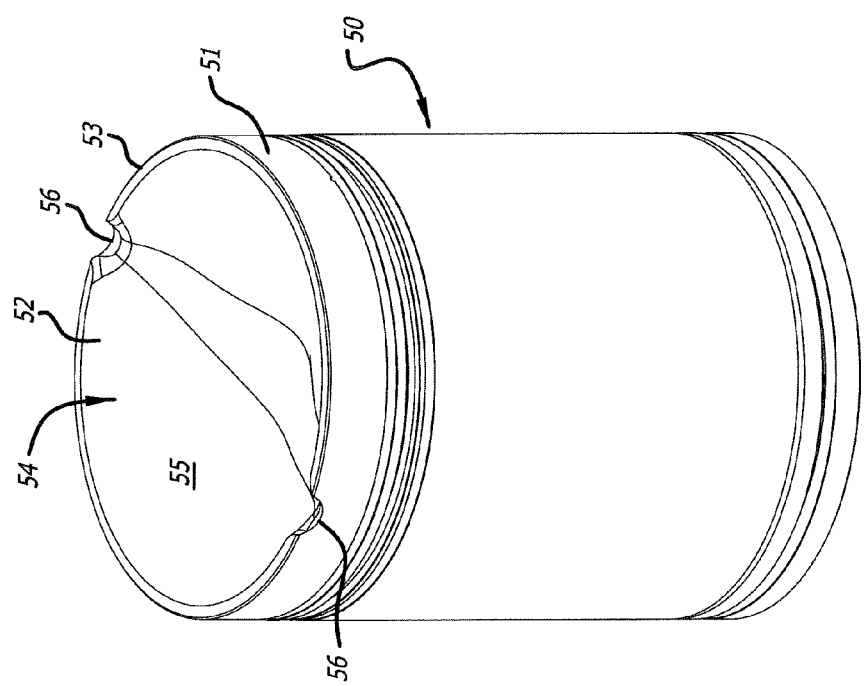

FIGS. 3A and 3B illustrate a pair of pistons 50 and 60 with complementary piston end surface structures for defining a combustion chamber having a central, largely spherical (or spheroidal) volume and lateral spray clearance channels that are mutually aligned along an injection axis and disposed on respective sides of the central space. In FIGS. 4A and 4B, the end surfaces are seen in plan; in FIGS. 5A and 5B the end surface are seen in elevational section. The piston 50 has a crown 51 with an end surface 52 including a periphery 53 surrounding a bowl 54 with a concave surface 55 curving away from the periphery 53 toward the interior of the piston 50. Opposed notches 56 formed in the end surface 52 open through the periphery 53 into the bowl 54. The other piston 60 has a crown 61 with an end surface 62 including a periphery 63 surrounding a convex portion 64 protruding outwardly from the interior of the piston 60. An elongated cleft 65 extending in a diametrical direction of the piston 60 is formed in the convex portion 64. Opposed notches 66 aligned along an injection axis 67 and formed in the end surface 61 open through the periphery 63 into respective ends of the cleft 65. As per the description to follow, the concave bowl 54 receives the convex portion 64 and covers the elongated cleft 65 to define a combustion chamber therewith.

As best seen in FIGS. 4B and 5B, the cleft 65 has an elongated, bilaterally symmetrical shape referenced to a plane of symmetry that contains the injection axis 67 and the longitudinal axis 68 of the piston 60. The bilaterally symmetrical shape is defined between mirrored ridges 69 protruding outwardly from the end surface of the piston 60. Viewing the end surface 62 in plan, as in FIG. 4B, each ridge includes a central portion 72 that curves outwardly (toward the periphery 63) and transitions to flanking portions 74 that curve inwardly (away from the periphery 63). The outward/inward variation in the curvature of the mirrored central portions defines a largely spherical (or spheroidal) volume 75 in the central portion of the cleft 65 and lateral spray clearance channels 77 that are mutually aligned along the injection axis 67 and disposed on respective sides of the central volume 75.

The end surface constructions thus far described provide flexibility in management of piston thermal loads. Preferably, the piston 50 is placed on the exhaust side of a cylinder. The exhaust piston tends to be hotter because of the longer exposure to high temperature exhaust gases during the engine operating cycle. The concave bowl 54 has a smaller surface area for heat transfer than the highly contoured end surface of the piston 60; there is, therefore, a lower heat flux through the end surface 52 than through the end surface 62. As best seen in FIG. 5A, the piston 50 has an internal cooling structure that includes an annular gallery 57 and a central gallery 58 through which liquid coolant circulates. Preferably, the piston 60 is placed on the intake side of the cylinder where the generally convex shape, the cleft, the protruding surfaces, and the larger surface area of the end surface 62 are exposed to the cooling effects of the intake flow of charge air when the intake port opens as the piston 60 moves through BC. The protruding surfaces 64 are difficult to cool and tend to bear the greatest thermal load. And so, as FIG. 5B shows, the piston 60 is provided with an internal cooling structure that includes an annular gallery 87 and a central gallery 88 through which liquid coolant circulates. With reference to FIG. 4B, the wider central portion of the combustion chamber achieved by the enlarged spherical center portion 75 of the cleft 65 minimizes the interaction between the flame and the wall of the piston 60 to minimize heat transfer. This larger central portion 75 is achievable without increasing the combustion volume thanks to the reduction of the angle of the spray clearance channels 77 resulting from the inwardly-curving ridge portions 74.

Figure 6A:
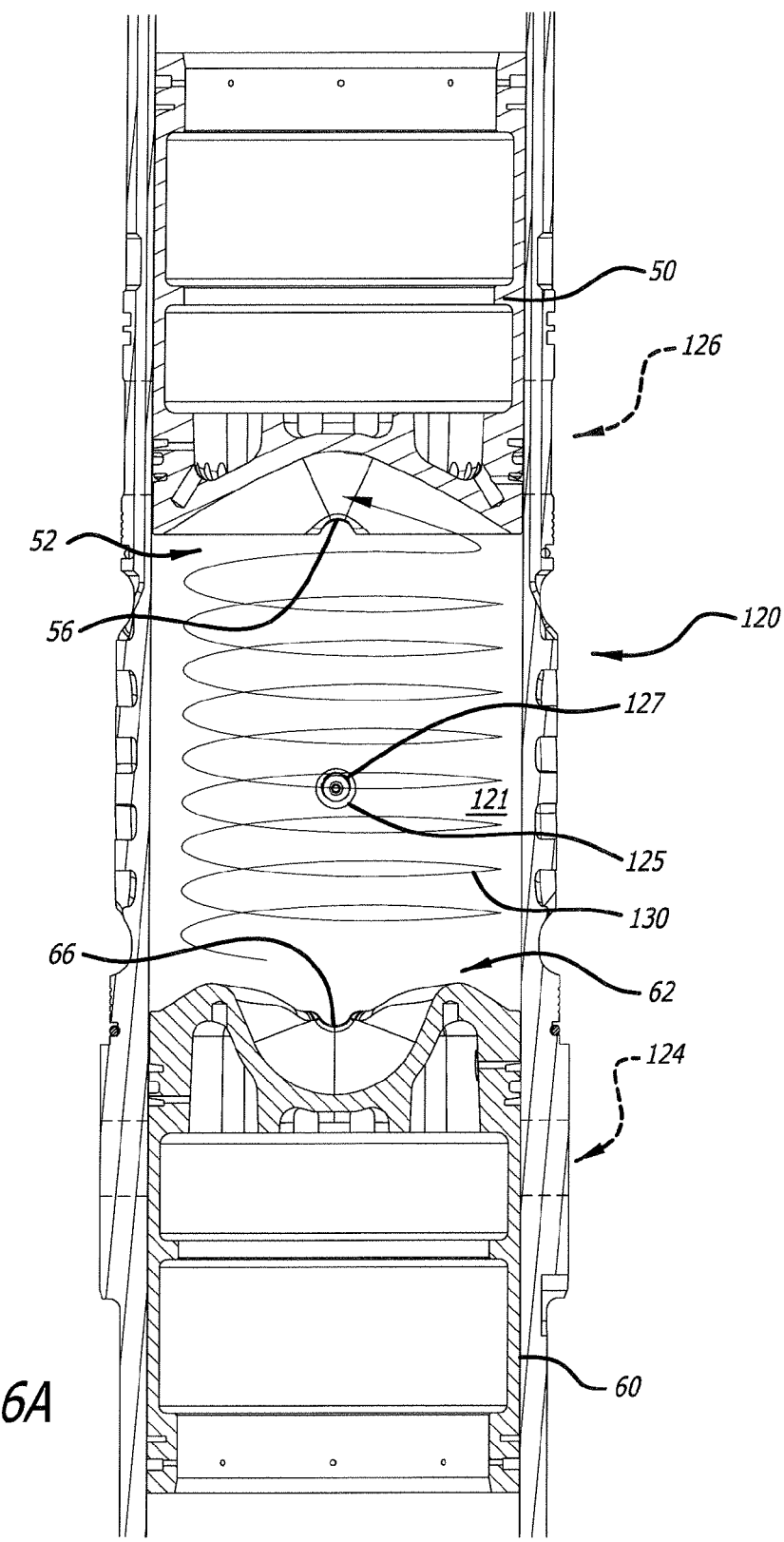
FIGS. 6A and 6B are side sectional drawings showing an operational sequence during a compression stroke of an opposed-piston engine including a pair of pistons according to FIGS. 3A and 3B.
Figure 6B:
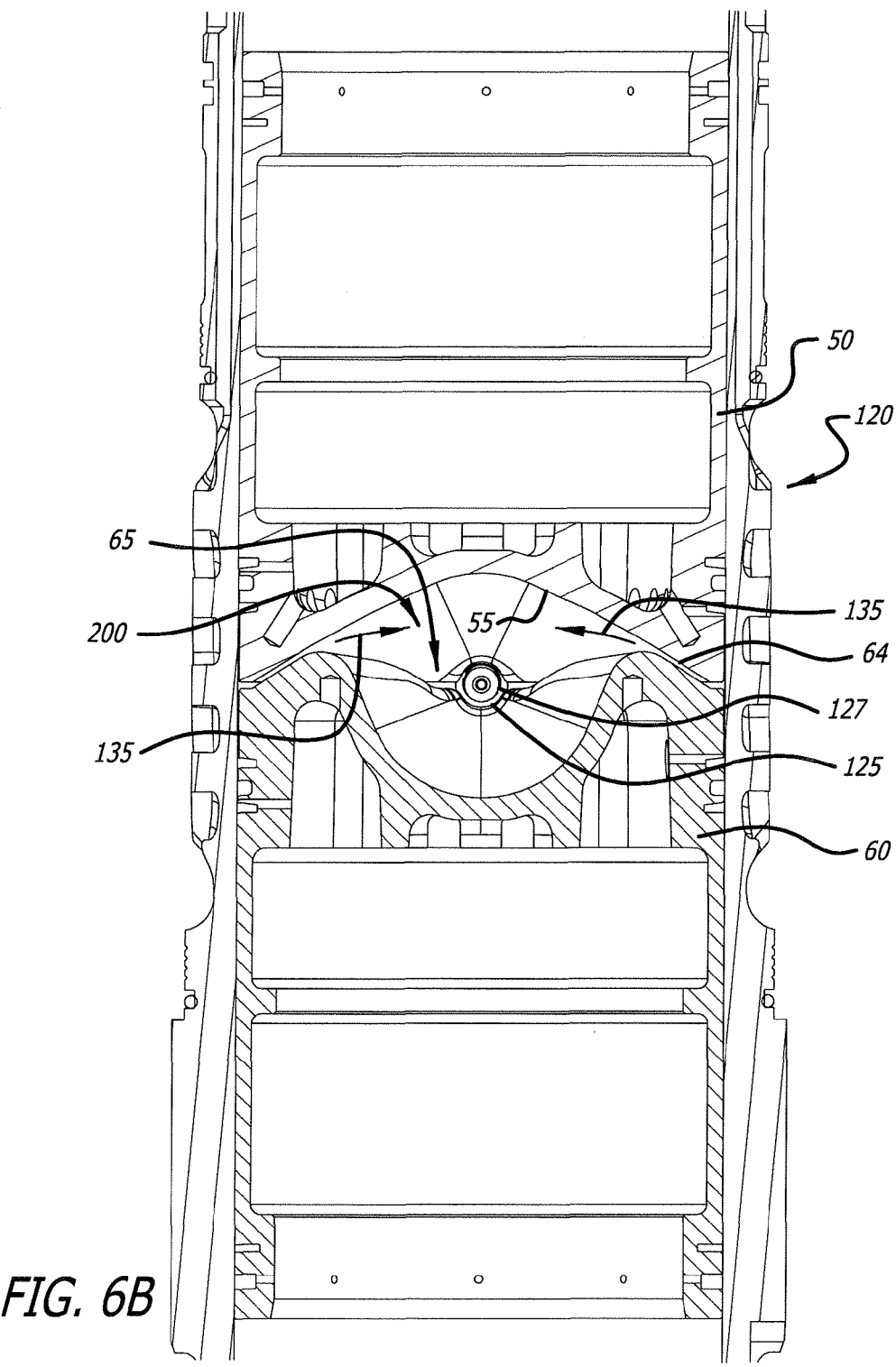

Refer now to FIGS. 6A and 6B for an understanding of the operation of an opposed-piston engine equipped with opposed pistons constructed as shown in FIGS. 3A and 3B. The engine includes one or more ported cylinders. Each cylinder 120 includes a bore 121 and longitudinally-separated intake and exhaust ports 124 and 126. In FIG. 6A, the two pistons 50 and 60 are shown near respective BC locations within the bore 121 of a ported cylinder 120. FIG. 4B shows the pistons 50 and 60 near TC locations in the bore 121. The pistons 50 and 60 are rotationally oriented in the bore so as to align the end surfaces 52 and 62 in complement; that is to say, the notches 56 of the end surface 52 are aligned with the notches 66 of the end surface 62, and each notch pair 56, 66 is positioned in alignment with an injector port 125 that opens through the sidewall of the cylinder 120. Charge air enters the cylinder 120 through the intake port 124 as exhaust products flow out of the cylinder through the exhaust port 126. For purposes of scavenging and air/fuel mixing, the charge air is caused to swirl as it passes through the intake port. As per FIG. 6A, when the pistons 50 and 60 move away from BC in a compression stroke, the intake and exhaust ports are closed and the swirling charge air 130 is increasingly compressed between the end surfaces 52 and 62. With reference to FIG. 6B, as the pistons 50 and 60 approach TC, a combustion chamber 200 is defined between the end surfaces 52 and 62. The combustion chamber 200 has a cavity defined between the central portion of the concave surface 55 and the elongated cleft 65.

Referring to FIG. 6B, as the pistons 50 and 60 approach TC positions, squish flows 135 of compressed charge air flow into the combustion chamber 200 from the peripheries of the end surfaces, through opposing curved squish regions defined between concave-convex surface portions 55, 64. At the same time, compressed air nearer the longitudinal axis of the cylinder 120 continues to swirl. The interactions of swirl and squish flow produce tumble at each end of the combustion chamber 200. Each tumble component has a motion that circulates around the injector axis. That is to say, the tumble circulates around a diameter of the cylinder 120 that is generally collinear with the injection axis.

Figure 7:
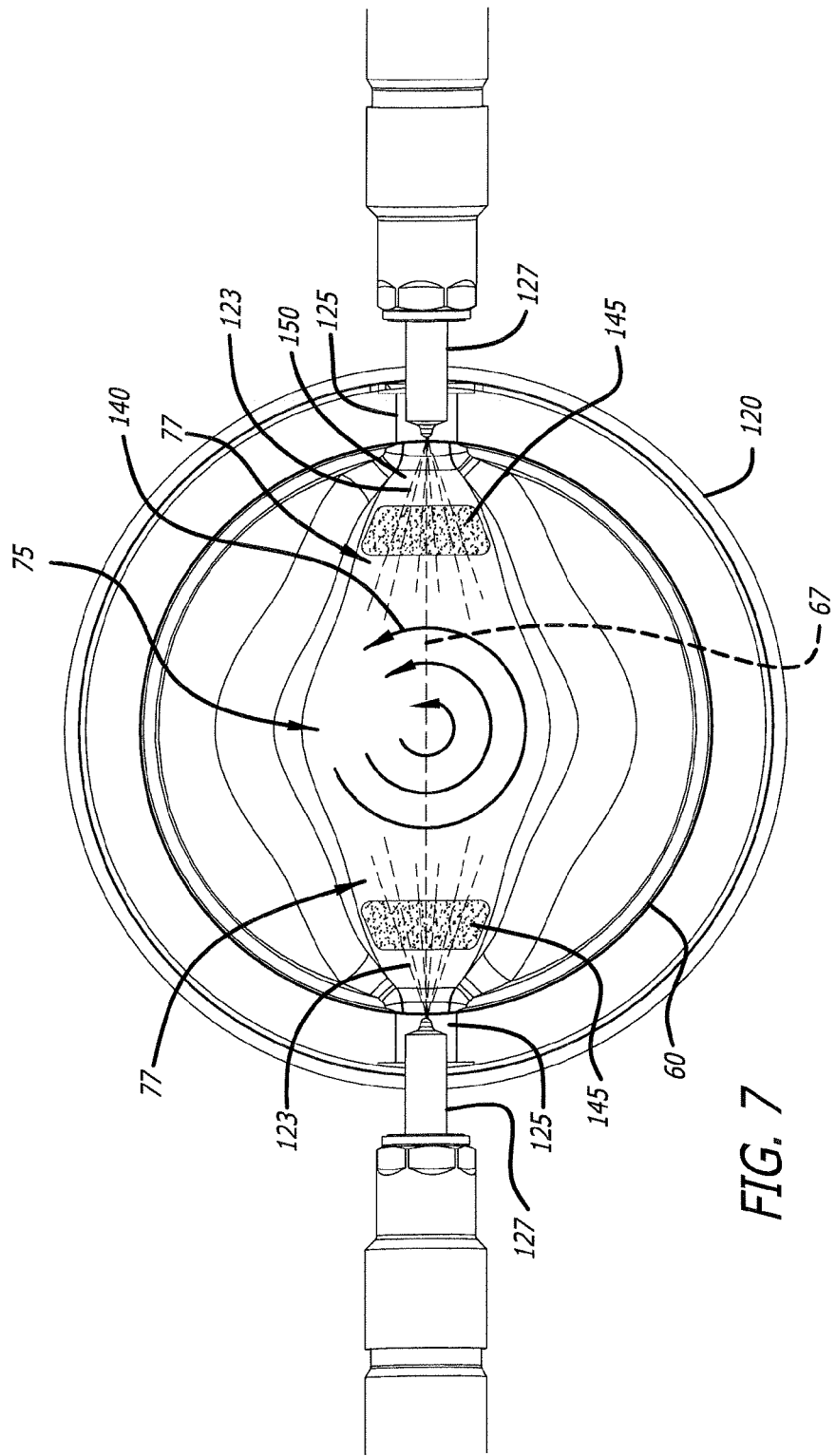
FIG. 7 is an end view of the piston of FIGS. 3A, 4A, and 5A showing an end surface with mirrored ridges protruding therefrom and a pattern of fuel injection in a combustion chamber formed therewith.

With reference to FIGS. 6B and 7, as the pistons 50 and 60 move through their respective TC locations, the adjacent concave-convex end surfaces and form a combustion chamber cavity having an elongated, bilaterally symmetrical shape referenced to an injector axis and a pair of injection ports located on the injector axis. Opposing pairs of notches 56, 66 (see FIG. 6A) in the end surfaces and define injection ports that open into the combustion chamber 200 at opposing positions of the combustion chamber.

With reference to FIGS. 6A, 6B, and 7, fuel 123 is injected through injection ports 125 in the cylinder 120 into the combustion chamber 200 by opposed injectors 127. The fuel 123 travels through the lateral spray clearance channels 77 into the central portion 75 where it encounters and mixes with a largely spherical flow field 140 of swirling charge air 130. The tumble flows result from interactions of swirl and squish as described in the parent and grandparent applications. The tumble flows 145 circulate around the injector axis 67 and act jointly with the swirl 130 in the combustion chamber 200 to create the spherical flow field 140. As injection continues, the swirling mixture of air and fuel is increasingly compressed in the combustion chamber. When the mixture reaches an ignition temperature, fuel ignites in the combustion chamber.

Although principles of piston and combustion chamber constructions have been described with reference to presently preferred embodiments, it should be understood that various modifications can be made without departing from the spirit of the described principles. Accordingly, the patent protection accorded to these principles is limited only by the following claims.

The invention claimed is:

1. A combustion chamber construction for an opposed-piston engine including at least one cylinder with a bore and longitudinally-separated exhaust and intake ports and a pair of pistons disposed in opposition to one another in the bore of the cylinder, in which:
   the pistons have shaped end surfaces that form a combustion chamber having an elongated, bilaterally symmetrical shape referenced to a plane of symmetry that includes an injection axis of the combustion chamber and a pair of injection ports located on the injection axis when the pistons are near respective top center positions in the cylinder;
   the combustion chamber is defined between a bowl in the end surface of a first piston of the pair of pistons and a generally convex portion of the end surface of a second piston of the pair of pistons that comprises outwardly protruding mirrored ridges and a cleft between the outwardly protruding mirrored ridges, as the bowl in the end surface of the first piston receives the convex portion and covers the cleft;
   when the end surface of the second piston is viewed in plan, each ridge includes a central portion that curves toward a periphery of the end surface of the second piston and transitions to respective flanking portions that curve away from the periphery; and,
   the cylinder includes a pair of opposed fuel injector ports with which the injection ports of the combustion chamber align when the first and second pistons are near the respective top center positions.

2. The combustion chamber construction of claim 1, in which the central portions of the mirrored ridges define a combustion chamber volume having a substantially spherical or spheroidal shape when the combustion chamber is formed.

3. The combustion chamber construction of claim 2, in which each end surface includes a peripheral edge, an annular surface running inside the peripheral edge, and diametrically-opposed notches formed in the annular surface, wherein the notches on the end surface of the first piston align with the notches on the end surface of the second piston to form the pair of injection ports when the first and second pistons are near the respective top center top center positions.

4. The combustion chamber construction of claim 3, in which the first piston controls the exhaust port and the second piston controls the intake port.

5. The combustion chamber construction of claim 1, in which the first piston controls the exhaust port and the second piston controls the intake port.

6. The combustion chamber construction of claim 1, wherein:
   the cleft has an elongated, bilaterally symmetrical shape referenced to the plane of symmetry that includes the injection axis of the combustion chamber; and
   the bowl in the end surface of the first piston has a concave surface that curves away from a periphery of the piston toward the interior of the piston.

7. An opposed-piston engine, comprising:
   at least one cylinder with longitudinally-separated exhaust and intake ports;
   a pair of pistons disposed in opposition to one another in a bore of the cylinder, each piston operable to move from a respective bottom center (BC) position to a respective top center (TC) position in the bore during a compression stroke, in which:
   the pistons have shaped end surfaces that form a combustion chamber having an elongated, bilaterally symmetrical shape referenced to a plane of symmetry that includes an injection axis of the combustion chamber and a pair of injection ports located on the injection axis when the pistons are near respective top center positions;
   the combustion chamber is defined between a bowl in the end surface of a first piston of the pair of pistons and a generally convex portion of the end surface of a second piston of the pair of pistons that comprises outwardly protruding mirrored ridges and a cleft between the outwardly protruding mirrored ridges, as the bowl in the end surface of the first piston receives the convex portion and covers the cleft;

when the end surface of the second piston is viewed in plan, each ridge includes a central portion that curves toward a periphery of the end surface of the second piston and which transitions to flanking portions that curve away from the periphery; and, the cylinder includes a pair of diametrically opposed fuel injector ports with which the injection ports of the combustion chamber align when the first and second pistons are near the respective top center positions.

8. The opposed-piston engine of claim 7, in which the central portions of the mirrored ridges define a combustion chamber volume having a substantially spherical or spheroidal shape when the combustion chamber is formed.

9. The opposed-piston engine of claim 8, in which each end surface includes a peripheral edge, an annular surface running inside the peripheral edge, and diametrically-opposed notches formed in the annular surface, wherein the notches on the end surface of the first piston align with the notches on the end surface of the second piston to form the pair of injection ports when the first and second pistons are near the respective top center positions.

10. The opposed-piston engine of claim 9, in which the first piston moves past the exhaust port and the second piston moves past the intake port.

11. The opposed-piston engine of claim 7, in which the first piston moves past the exhaust port and the second piston moves past the intake port.

12. A method for operating an opposed-piston engine including a cylinder, a pair of opposed pistons in the bore of the cylinder and spaced-apart intake and exhaust ports controlled by the pistons, by:

introducing swirling charge air into the cylinder between the pistons;

moving the pistons toward each other in a compression stroke;

forming a combustion chamber between a bowl formed in a first piston of the pair of pistons and a generally convex portion of the end surface of a second piston of the pair of pistons that comprises outwardly protruding mirrored ridges and a cleft between the outwardly protruding mirrored ridges, as the bowl in the end surface of the first piston receives the convex portion and covers the cleft;

concentrating swirling charge air in a central, partially spherical portion of the combustion chamber between the end surfaces of the pistons as the pistons move toward respective top center positions in the bore;

generating tumble in charge air in respective lateral portions of the combustion chamber; and injecting fuel into the combustion chamber through the lateral portions.

13. The method of claim 12, in which injecting fuel into the combustion chamber includes injecting the fuel along an injection axis of the combustion chamber.

14. The method of claim 13, in which injecting fuel into the combustion chamber includes injecting opposing sprays of the fuel along the injection axis.

15. The method of claim 12, in which generating tumble includes generating respective counter-rotating tumble motions in the lateral portions of the combustion chamber.

16. The method of claim 15, in which injecting fuel into the combustion chamber includes injecting opposing sprays of fuel along an injection axis of the combustion chamber.

17. The method of claim 12, further including generating opposing inward squish flows of charge air as the combustion chamber is formed.

18. The method of claim 17, in which generating tumble includes generating respective counter-rotating tumble motions in the lateral portions of the combustion chamber.

19. The method of claim 18, in which injecting fuel into the combustion chamber includes injecting the fuel along an injection axis of the combustion chamber.

20. The method of claim 19, in which injecting fuel into the combustion chamber includes injecting opposing sprays of fuel along the injection axis.

21. The method of claim 19, further including igniting the fuel in response to compression of charge air in the combustion chamber.

* * * * *

UNITED STATES PATENT AND TRADEMARK OFFICE
CERTIFICATE OF CORRECTION

PATENT NO. : 9,512,779 B2  
APPLICATION NO. : 14/026931  
DATED : December 6, 2016  
INVENTOR(S) : Fabien G. Redon Page 1 of 1

It is certified that error appears in the above-identified patent and that said Letters Patent is hereby corrected as shown below:

In the Claims

Column 8, Claim 3, Line 31, change "top center top center positions" to read "top center positions"

Signed and Sealed this
Twenty-eighth Day of February, 2017

Michelle K. Lee
*Director of the United States Patent and Trademark Office*